US 12,355,491 B2
Jul. 8, 2025

(12) United States Patent
Bernier et al.

(10) Patent No.: US 12,355,491 B2
(45) Date of Patent: Jul. 8, 2025

(54) OPTICAL MODULATOR CONTROL SYSTEM FOR INTERCONNECT TRANSCEIVERS

(71) Applicant: HUAWEI TECHNOLOGIES CO., LTD., Shenzhen (CN)

(72) Inventors: Eric Bernier, Kanata (CA); Mohammad Mehdi Mansouri Rad, Kanata (CA)

(73) Assignee: HUAWEI TECHNOLOGIES CO., LTD., Shenzhen (CN)

(*) Notice: Subject to any disclaimer, the term of this patent is extended or adjusted under 35 U.S.C. 154(b) by 184 days.

(21) Appl. No.: 18/102,923

(22) Filed: Jan. 30, 2023

(65) Prior Publication Data

US 2023/0254043 A1     Aug. 10, 2023

Related U.S. Application Data

(63) Continuation of application No. 17/340,479, filed on Jun. 7, 2021, now Pat. No. 11,569,913.

(60) Provisional application No. 63/041,575, filed on Jun. 19, 2020.

(51) Int. Cl.
*H04B 10/40* (2013.01)
*H04B 10/077* (2013.01)
*H04B 10/50* (2013.01)
*H04B 10/60* (2013.01)

(52) U.S. Cl.
CPC ......... *H04B 10/40* (2013.01); *H04B 10/0771* (2013.01); *H04B 10/503* (2013.01); *H04B 10/50* (2013.01); *H04B 10/60* (2013.01)

(58) Field of Classification Search
None
See application file for complete search history.

(56) References Cited

U.S. PATENT DOCUMENTS

| | | | |
|---|---|---|---|
| 4,991,229 A * | 2/1991 | Nelson | H04B 10/50 398/20 |
| 6,118,566 A | 9/2000 | Price | |
| 9,991,953 B1 | 6/2018 | Fludger et al. | |
| 10,110,302 B2 | 10/2018 | Mansouri Rad et al. | |

(Continued)

FOREIGN PATENT DOCUMENTS

CN     205986881 U     2/2017

OTHER PUBLICATIONS

Kim et al., A Mach-Zehnder Modulator Bias Controller Based on OMA and Average Power Monitoring, IEEE Photonics Technology Letters, vol. 29, No. 23, pp. 2043-2046, Dec. 1, 2017.

(Continued)

*Primary Examiner* — Darren E Wolf (57) ABSTRACT

An interconnect transceiver for transmitting and receiving optical signals, comprising an electronics module with a transceiver engine, and a photonics module with a laser source, a modulator, a photodetector to monitor the laser, one to receive an external optical signal, and a controller to operate the laser source and the laser source modulator, an electronic switch having two states is proposed. The first state is to allow monitoring of the modulated laser source by the transceiver engine, so as to acquire a reference set of operating parameters, and the second state is where a signal from the modulated laser source is directed to the controller, such as to allow real-time control of the source of the transmitting laser and modulator by the controller.

47 Claims, 7 Drawing Sheets

(56) References Cited

U.S. PATENT DOCUMENTS

| | | | |
|---|---|---|---|
| 11,057,114 | B2 | 7/2021 | Chen et al. |
| 2003/0185563 | A1* | 10/2003 | Stephens ............ H04B 10/2507 359/25 |
| 2011/0013907 | A1* | 1/2011 | Sugihara ............... G02F 1/0123 398/38 |
| 2013/0183032 | A1* | 7/2013 | Ide ......................... H04B 10/40 398/140 |
| 2014/0193160 | A1* | 7/2014 | Yagisawa ............. G02B 6/4284 398/136 |
| 2016/0359567 | A1 | 12/2016 | Kakande |
| 2017/0093486 | A1* | 3/2017 | Rad .................... G01M 11/3145 |
| 2019/0033542 | A1 | 1/2019 | Epitaux et al. |
| 2019/0199436 | A1 | 6/2019 | Sahni |
| 2021/0234613 | A1* | 7/2021 | Gopalarathnam . H04B 10/0799 |

OTHER PUBLICATIONS

Thraskias, et al., "Survey of Photonic and Plasmonic Interconnect Technologies for Intra-Datacenter and High-Performance Computing Communications," IEEE Communications Surveys and Tutorials, vol. 20, No. 4, pp. 2757-2783, May 2018.

Sun, et al., "A 45 nm CMOS-SOI Monolithic Photonics Platform With Bit-Statistics-Based Resonant Microring Thermal Tuning," Journal of Solid-State Circuits, vol. 51, No. 4, pp. 893-907, Apr. 2016.

De Sea, et al., "Power handling of silicon microring modulators," Optics Express, vol. 27, No. 17, Aug. 18, 2019.

Dong et al., "Simultaneous Wavelength Locking of Microring Modulator Array with a Single Monitoring Signal", Optics Express, vol. 25, No. 14, pp. 16040-16046, Jul. 10, 2017.

Zheng et al., "A high-speed, tunable silicon photonic ring modulator integrated with ultra-efficient active wavelength control," vol. 22, No. 10, pp. 12628-12633, May 2014.

Kim et al., "A Temperature Controller IC for Maximizing Si Micro-Ring Modulator Optical Modulation Amplitude", J. Lightwave Technology, vol. 37, No. 4, pp. 1200-1206, Feb. 15, 2019.

Agrawal et al., "Wavelength Locking of a Si Ring Modular Using an Integrated Drop-Port OMA Monitoring Circuit", J. Solid State Circuits, vol. 51, No. 10, pp. 2328-2344, Oct. 2016.

Agarwal et al., "Wavelength Locking of a Si Ring Modular Using an Integrated Drop-Port OMA Monitoring Circuit", IEEE Asian Solid-State Circuits Conference, Nov. 9-11, Xiamen, Fujian, China.

* cited by examiner

OPTICAL MODULATOR CONTROL SYSTEM FOR INTERCONNECT TRANSCEIVERS

CROSS-REFERENCE TO RELATED APPLICATIONS

This application is a continuation of U.S. patent application Ser. No. 17/340,479, entitled "OPTICAL MODULATOR CONTROL SYSTEM FOR INTERCONNECT TRANSCEIVERS" filed Jun. 7, 2021 and claims the benefit of priority to U.S. Provisional Patent Application Ser. No. 63/041,575, entitled "Optical Modulator Control System for Next Generation Interconnect Transceivers" and filed Jun. 19, 2020, the contents of which are incorporated herein by reference.

FIELD OF THE INVENTION

This invention pertains generally to the field of signal transmission and reception devices and in particular to silicon-photonics interconnects.

BACKGROUND OF THE INVENTION

Large scale data centers (DC) and high-performance computing (HPC) systems require increased computing power at higher energy efficiency. The considerable power consumed by such operations is a main source of concern, as well as determining factor, for the next generation of interconnect technologies. As a result, the energy per bit of each candidate for an interconnect is a key indicator of its feasibility and qualifications for these applications. In the last decade, the transmission rates of optical interconnect technology in IEEE 802.3 standards have evolved from 10 Gbps to 200 Gbps and 400 Gbps, and industry standards are currently being considered for rates of 800 Gbps and beyond.

As such, various schemes and architectures have been proposed for satisfying the upcoming requirements, with a focus on high-density, small footprint, small power consumption, and support for scalability. In particular, the energy per bit of an interconnect transceiver (TRX) module, expressed in Joules per bit (J/b), is a key metric. Such technologies are desirable to support operations under uncooled environments, where temperature can typically vary between 20° C. and 70° C., making the optimization of reliability, power consumption and footprint even more challenging.

To address the needs in interconnect design, various modulator technologies and architectures have been proposed, including Mach-Zehnder Interferometer (MZI) based modulators, vertically emitting laser modulators (VECSEL), electro-absorption modulator (EAM), and others. A quantitative and qualitative comparison of such emerging technologies is discussed in prior art (e.g. C. A. Thraskias, et al., "Survey of Photonic and Plasmonic Interconnect Technologies for Intra-Datacenter and High-Performance Computing Communications," IEEE Communications Surveys and Tutorials, Vol. 20, No. 4, pp. 2757-2783, Fourth Quarter 2018).

Microring resonators are one of the possibilities that have been extensively studied and evaluated for modulation applications. A microring resonator (MRR)-based modulator is small in size and efficient in power consumption. It can support the high data rates needed for the next generations of interconnect technologies. Further, it can support easy scalability for wavelength-division multiplexing (WDM) architectures, where terabits of data are carried on a single strand of fiber, which can support high densities, as well as easy and inexpensive cabling management.

While MRR-based modulators address most of the requirements for interconnect technologies, they also present some serious technical challenges, a significant one being that of control. In other words, an ongoing technical challenge is to provide for efficient and reliable control of MRR-based modulators. Because an MRR is a resonance-based modulator (as its name indicates), its performance is highly sensitive to the tuning capability of the resonance points and the laser wavelength. An MRR modulator should be kept at an optimized operating point. A controller is then meant to keep the MRR modulator tuned to an adequate operating point even when its temperature, laser power, laser wavelength, DC bias, etc. change.

Many of the control schemes described in the literature mainly use advanced electro-optic systems and architectures that control the circuitry to measure the operation of a transmitter circuit during the startup phase, so as to find optimal adjustments for control metrics such as power, heater, drive voltage, radio-frequency (RF) swing etc.

Control circuits are expected to operate at lower speeds, and to be much more inexpensive than those of a complementary metal-oxide-semiconductor (CMOS) TRX engine operating at data rates on the order of 100 Gbps. Control bandwidths are usually orders of magnitude lower than data rate bandwidths. This is due to costs, complexity, power consumption and size limitations. These lower control bandwidths inherently limit the control system's capacity to properly assess and evaluate the quality of the modulated data at much higher rates. Other factors, to be explained below, further complicate the control system's task of finding an optimal operating point.

Fabrication errors and uncertainties add to the confusion of the control system, such as what to choose as a reference point to which to lock the controller. Therefore, various approaches try to perform a metric measurement (OMA, power etc.) as reliably as possible, in order to assess the quality of modulations. Knowing a reference point in advance is difficult because, for various reasons, chip characteristics as tested can be significantly different from their design targets. For instance, significant variations in nominal resonance wavelength of the ring, Q factor, heating efficiency etc. can be observed. In particular, the optimal adjustments for electro-optic circuitry such as electric DC biasing, RF levels, and optimal relative locations for the laser and ring resonator will be critical, and need to be adjusted on a per-module basis. As such, optimal adjustments will typically differ from module to module. A universal reference point is not expected to be very useful, particularly for a product considering all risks of fabrication.

Control complexity becomes significant, given that a silicon photonic-based structure has a significant uncertainty in the nominal location of its resonance. Lasers (to support inexpensive solutions) have unknown initial power and wavelength, and the electric losses of the lines are not fully known until they are realized. Therefore, knowing the optimal operation conditions of the transmitter is hardly possible, if not impossible.

The challenges of a controller become significant especially when operating at much larger input optical powers. The power going to each MRR is impacted by the "link-budget" requirements to have a reliable system engineering. Due to the insertion loss cost of an MRR, the coupling loss to and from a chip (such as in silicon-photonics), the cable and connector loss, etc., it is highly desirable to have MRRs operating at much higher optical powers than what has been presented in the literature. High powers create many problems known as optical nonlinearities, which effectively change the loss at the microring (and hence its modulation efficiency). These indicate the occurrence of two-photon absorption (TPA), which increases self-heating effects. These effects are studied in the recent paper of M. De Sea, et al. "Power handling of silicon microring modulators," Optics-Express, Vol. 27, No. 17, 19 Aug. 2019). High-power regime operations also create instability issues, as well as pattern dependency (at sub-data rates), which means that an MRR modulator may swing between states following any perturbation. This further indicates the importance of control mechanism in such architectures.

Many proposals in the prior art are efficient in their context, but suffer from various issues mainly related to finding initial optimal operating points, which is required for product implementation and commercialization. Most of these architectures are proposed for conditions where the input power to an MRR is very small (below 0 dBm), and hence the modulator is in linear state, making the control fundamentally easy and straightforward. Additionally, the cost of adding expensive electro-optic hardware and corresponding control software to find the OMA (or related metrics) is not negligible for production and commercialization. Most solutions focus on non-return-to-zero (NRZ) applications (when a signal has only two levels "0" and "1") and can hardly scale to other constellation schemes such as pulse amplitude modulation (PAM-4 or PAM-8) and beyond. Control schemes typically require high-bandwidth (very fast) photodetectors, digital-to-analog convertors (DACs), and control non-trivial algorithms with dead zones.

In "A Mach-Zehnder Modulator Bias Controller Based on OMA and Average Power Monitoring," Kim et. al., IEEE Photonics Technology Letters, vol. 29, No. 23, December 2017, an integrated circuit for Mach-Zehnder Modulator (MZM) bias control is described and demonstrated. The circuit, which includes a digital-to-analog converter, analog-to-digital converter, trans-impedance amplifier, power detector, track-and-hold circuit, comparator, and digital controller, purportedly determines the optimal MZM bias voltage and maintains this bias voltage by monitoring average modulated power. However, the OMA monitoring circuit proposed in this publication (e.g. in the upper part of FIG. 2) adds significant complexity to the controller, and must be designed specifically for the transmitter being used.

U.S. Pat. No. 10,110,302 describes an optical device comprising a transmitter module, a receiver module, and a switch coupling to the transmitter module, the receiver module, and transmitter and receiver fibers. A monitor mode is available for monitoring of the transmitter fiber or the receiver fiber. However, further innovations, additions and variations in such a device are possible.

In summary, a controller either needs to know in advance what point to tune to, which is significantly challenging considering the uncertainties of the fabrication process and per-module behavior, or it needs sophisticated electro-optical circuitry to properly measure performance under optimal alignment, and then lock on to that optimal tuning point. However, when there is a change in the technology, baudrate, modulation format, signal power or other metrics, the control system's design and circuitry have to be re-evaluated for further iterations of the interconnect product, which is not desirable. Various prior art schemes lack a guaranteed solution that is agnostic to these parameters.

Therefore, there is a need for a method and apparatus for optical interconnect transceiver control that obviates or mitigates one or more limitations in the prior art.

This background information is intended to provide information that may be of possible relevance to the present invention. No admission is necessarily intended, nor should be construed, that any of the preceding information constitutes prior art against the present invention.

SUMMARY OF THE INVENTION

Ideally, a control system for an optical modulator should be kept simple and its design agnostic, in that it should be compatible with a variety of modulator and transceiver architectures. The present disclosure pertains to an interconnect architecture which potentially improves upon designs in the prior art. For an architecture that combines a CMOS TRX engine and a (e.g. silicon-photonics) module for the transmitter and receiver, embodiments of the present invention incorporate a two-state switch that allows the TRX engine to be used for collecting transmitter parameters during startup of the transmitter, and for providing (e.g. real-time) feedback to the transmitter's controller during operation.

According to an embodiment of the present invention, there is provided an interconnect transceiver device for transmitting and receiving optical signals. The device includes at least a transceiver engine, a modulator, a photodetector, a controller and a switch. The modulator is configured to controllably modulate an optical carrier to produce an optical signal. The photodetector is configured to monitor the optical signal output by the modulator. The controller may be separate from the transceiver engine and is configured to control the modulator. The switch is switchable between a first state and a second state, where, in the first state, the switch directs an output signal of the photodetector to the transceiver engine, and, in the second state, the switch directs the output signal of the photodetector to the controller.

The transceiver engine and associated electronics (e.g. the switch) may be implemented using a complementary metal-oxide semiconductor (CMOS) fabrication process. The modulator and associated photonics components may be implemented using a silicon-based fabrication process, or another process such as but not necessarily limited to a silicon-nitride ($Si_3N_4$) process or an Indium Phosphide (InP) process. The modulator may be a microring resonance modulator or another type of modulator. The photodetector may be a fast photodetector having a bandwidth equal to or greater than a bandwidth of the optical signal.

The interconnect transceiver may further include a second photodetector configured to receive an external optical signal. In this case, the switch may in some embodiments be configured, in the first state, to direct the output signal of the photodetector to a first input of the transceiver engine, and in the second state, to alternatively direct output of the second photodetector to the first input of the transceiver engine.

According to another embodiment of the present invention, there is provided an interconnect transceiver for transmitting and receiving optical signals. The device includes a modulator, a photodetector, a controller and a transceiver engine. The modulator is configured to provide a modulated optical signal. The photodetector is operatively coupled to an output of the modulator and is configured to generate an electrical signal indicative of the modulated optical signal. The controller is configured to controllably adjust one or more operating conditions of the modulator. The transceiver engine is configured to operate the modulator in generation of the modulated optical signal and is further configured to process optical signals received by the interconnect transceiver following conversion to corresponding electrical signals. The transceiver engine is further configured to operate, in a first mode, to receive and process the electrical signal indicative of the modulated optical signal, and to provide, to the controller, parameters indicative of the modulated optical signal. The controller is configured to controllably adjust said one or more operating conditions of the modulator based on the parameters indicative of the modulated optical signal.

In some embodiments, the device is further operable in a second mode, different from the first mode. In the second mode, the controller is configured to directly receive and process the electrical signal indicative of the modulated optical signal, and to controllably adjust said one or more operating conditions of the modulator based on the electrical signal.

In some embodiments, the device also includes a switch selectably operable between a first state and a second state. In the first mode, the switch is configured to operate in the first state to provide the electrical signal to the transceiver engine. In the second mode, the switch is configured to operate in the second state to provide the electrical signal to the controller.

In some embodiments, the device is (as above) operable in a second mode different from the first mode and further includes a second photodetector operatively coupled to the output of the modulator. The second photodetector is configured to generate a second electrical signal indicative of the modulated optical signal. In the second mode, the controller is configured to receive and process the second electrical signal, and to controllably adjust said one or more operating conditions of the modulator based on the second electrical signal. In some further embodiments, the device also includes an optical switch selectably operable between a first state and a second state. The optical switch is configured to receive a portion of the output of the modulator. In the first mode, the switch is configured to operate in the first state to provide the portion of the output of the modulator to the photodetector. In the second mode, the switch is configured to operate in the second state to provide the portion of the output of the modulator to the second photodetector.

According to another embodiment of the present invention, there is provided a method for implementation in an optical interconnect transceiver for transmitting and receiving optical signals. The optical interconnect transceiver includes a modulator configured to provide a modulated optical signal for transmission, and a transceiver engine which is configured to operate the modulator in generation of the modulated optical signal. The transceiver engine may be further configured to process optical signals received by the optical interconnect transceiver following conversion to corresponding electrical signals. The method includes receiving, by the transceiver engine, output of a photodetector operatively coupled to the modulator. The photodetector is configured to generate, as said output, an electrical signal indicative of the modulated optical signal. The method includes (e.g. in one mode of operation) providing, by the transceiver engine to a controller configured to controllably adjust one or more operating conditions of the modulator, parameters indicative of the modulated optical signal. The method includes adjusting, by the controller, the one or more operating conditions of the modulator based on the parameters indicative of the modulated optical signal.

In some embodiments, the method further includes, in another mode of operation, directly providing the electrical signal indicative of the modulated optical signal to the controller, and adjusting, by the controller, the operating conditions of the modulator based on the electrical signal.

In some embodiments, the method further includes operating a switch to controllably direct the output of the photodetector either to the transceiver engine or to the controller. Specifically, the switch directs the output of the photodetector to the controller during the other mode of operation.

In some embodiments, the device further includes a second photodetector configured to receive an external optical signal. In such embodiments, the switch further directs the output of the second photodetector to a first input of the transceiver engine during the other mode of operation. This first input also receives output of the photodetector when not in said other mode of operation.

In some embodiments, the method further includes, in a mode of operation different from the above-mentioned one mode, providing another electrical signal indicative of the modulated optical signal to the controller, and adjusting, by the controller, the operating conditions of the modulator based on this other electrical signal. The other electrical signal is provided by a second photodetector operatively coupled to the modulator and configured to generate the second electrical signal indicative of the modulated optical signal. In some further embodiments, the method further includes operating an optical switch selectably operable between a first state and a second state. The optical switch is configured to receive a portion of the output of the modulator. In a first (e.g. acquisition) mode, the switch is configured to operate in the first state to provide the portion of the output of the modulator to the photodetector. In the other (e.g. tracking) mode, the switch is configured to operate in the second state to provide the portion of the output of the modulator to the second photodetector.

Transmitters using an MRR as an optical modulator are the main focus of this document. However, embodiments of the present invention can be directly applied to a variety of schemes employing a corresponding variety of technologies or architectures. For example, embodiments of the present invention can be implemented for other modulator technologies including but not necessarily limited to MZI, microdisk, VECSEL, and EAM based modulators.

DETAILED DESCRIPTION OF THE INVENTION

According to embodiments of the present invention, the capabilities of a CMOS transceiver (TRX) engine are used not only for receiving and transmitting interconnect data, but also or alternatively for acquiring the optical transmitter's own operation parameters. The CMOS TRX engine may otherwise be comparable to and operate similarly to CMOS TRX engines already known in the art.

In general, an optical modulator controller has two fundamental and important tasks, namely: 1) finding the optimal tuning frequency for the corresponding transmitter, and 2) locking and tracking the tuning frequency during its operation. The latter especially matters if the operation conditions, mainly the temperature, power and wavelength of the laser, change or drift over time. The first challenge in modulator control is finding the optimal operating conditions. The second challenge, i.e., tracking or locking to the optimal operating conditions once found, is more straightforward. This is because reference points (e.g., typically power readings at the input or output of a ring) are at this point known and can be monitored. The first task of the control unit is perhaps the most difficult one, because finding an optimal operating point without prior knowledge is generally non-trivial. As used herein, the term "optimal" is meant to encompass operating points which satisfy one or more predetermined performance criteria. These performance criteria can be arbitrarily complex and can include a variety of factors. For example, an operating point may be "optimal" with respect to a combination of signal quality, computation time and computation complexity. As such, an operating point might not necessarily result in the highest signal quality, but rather may result in an adequate signal quality given other constraints on the hardware.

Embodiments of the present invention are facilitated when the CMOS TRX engine has substantially the full capability of data recovery and collection, independently of where the signal is initiated or originated. In such cases, which are typical, the CMOS TRX engine can therefore be used to monitor the transceiver's own modulator output and search for an optimal adjustment of parameters such as, but not necessarily limited to, ring resonance wavelength, laser wavelength, and DC biasing of the RF signals. The CMOS TRX engine is configured to process optical signals received by the interconnect transceiver (after conversion by a photodetector), and thus is expected to inherently have the capabilities to monitor the transceiver's own modulator output. Processing optical signals can include determining characteristics of the optical signals, such as optical modulation amplitude (OMA), average output power, eye-diagram characteristics, bit error rates prior to or following forward error correction, or the like, or a combination thereof. Photodetectors can be photodiodes, for example. More generally, a photodetector can be a transducer device which converts an optical signal to a representative electrical signal.

In embodiments of the present invention, low-cost electro-optic detectors can be used for the optical transmitter's controller, and little to no additional circuitry for control initialization is required. Instead, the controller harnesses the TRX engine which is already present in the underlying transceiver design. The task of the controller is then significantly simplified. This is because a reliable reading of what the transmitter is actually doing is available using the transceiver's own circuitry, and the controller can lock on to it using relatively simple control mechanisms. Because little to no additional hardware, software, or firmware is needed for the controller's initialization, embodiments of the present invention provide for significant savings over those of prior art. It is noted that the controller can be separate from the transceiver engine, in the sense that it is functionally self-contained, although it may utilize inputs from the transceiver module. The controller can be separate from the transceiver module in the sense that it is constructed principally of separate components, although potentially integrated into the same overall device.

In embodiments of the present invention, upon startup of the controller, optimal tuning points can be found with low-cost control hardware. The controller doesn't necessarily require full capabilities regarding determining or adapting to factors such as the modulation format, etc. This is because the TRX engine capabilities are employed to measure the performance per each point of operation.

Because initial reference points to lock an optical modulator controller are only needed during the startup process, a controller's task, once the points are known, is generally only to refer to those set-points in the event that operating conditions change.

Additional potential benefits of embodiments of the present invention include:
- substantially guaranteed optimal tuning for all circuit components (power, DC bias, heater, etc.) can be searched, pending the tenability of finding the optimal point of operation;
- independence from baud-rate, constellation format, and technology context;
- wavelength division multiplexing (WDM)-compatibility and scalability;
- simplicity, cost-effectiveness, and implementable based on already proven technology.

Further, in various prior art considered by the inventors, a main, common feature is the presence of electro-optical circuitry specifically purposed for measuring the transmitter's performance and tuning it. Embodiments of the present invention potentially represent a more economical and efficient improvement upon this design.

Figure 1:
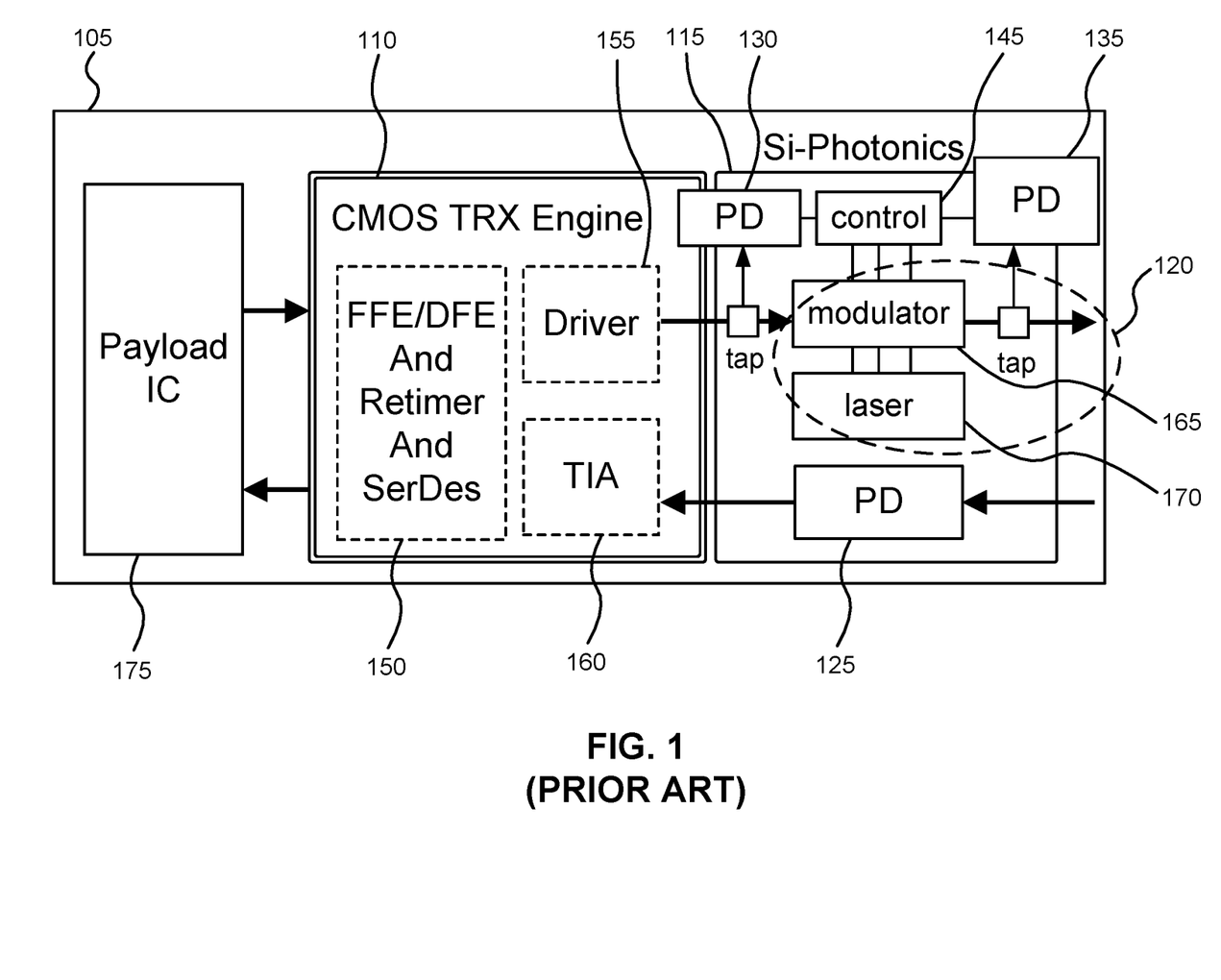
FIG. 1 illustrates an embodiment of a typical interconnect architecture on which embodiments of the present invention can be applied.

FIG. 1 illustrates a general scheme used in a conventional design, which can serve as a basis for comparison with embodiments of the present invention. The architecture includes an interconnect module 105 having co-integrated CMOS electronics and silicon-photonics for an optical interconnect. CMOS electronics are used to for the TRX engine 110, while silicon-photonics 115 are used for a portion 120 of an optical transmitter that can include a MRR modulator 165 and a laser 170, and a portion of an optical receiver that can include a photodetector (PD) 125. The module 105 can generally serve as an interconnect between an internal or external payload integrated circuit (IC) 175 and transmitted and received light signals.

In FIG. 1, the detector 130 at the input of the MRR modulator 165 and the detector 135 at the output of the MRR modulator 165 can be used in coordination with a controller 145. The detectors can be used to monitor operation of the MRR modulator. The detectors and controller can be used together to determine static and dynamic performance metrics of the portion 120 of the optical transmitter. Typically, this would include the optical modulation amplitude (OMA) or the average output power. Other performance metrics may be eye-diagram characteristics, bit error rates prior to forward error correction, bit error rates after forward error correction, etc. Such performance metrics can be used by a controller, transceiver engine, or both, during acquisition mode, tracking mode, or both, in order to adjust operation of the modulator.

Photodetectors can be classified as being "fast" or "slow" depending on their capabilities. A fast photodetector, as the term is used herein, has sufficient frequency bandwidth to convert an optical signal to an electronic form, such that substantially all information contents in the optical signal are preserved in and can be recovered from the electronic form. Accordingly, the bandwidth of the fast photodetector is typically equal to or greater than the bandwidth of the optical signal. Fast photodetectors can thus have a frequency bandwidth in the GHz range, for example. A slow photodetector in contrast has a frequency bandwidth which is insufficient to convert the optical signal fully to electronic form. However, certain aspects of the optical signal (e.g. averages, trends, or other characteristics) can still be determined by processing output of the slow photodetector. The slow photodetector may have a frequency bandwidth in the kHz or MHz range, for example, when the optical signal has a bandwidth in the GHz range. Related electro-optical circuits for measuring and tuning the transmitter can also be slow or fast, however, conventional systems rely on slow detectors.

Conventionally, fast photodetectors are used for converting a received, external optical signal to electronic form so that it can be processed by the TRX engine in order to recover information therefrom. However, slow photodetectors are conventionally used by the controller 145, because the controller itself conventionally does not have sufficient bandwidth or capability to take advantage of the full-bandwidth signal that would be available from a fast photodetector. However, according to embodiments of the present invention, when the TRX engine is used in cooperation with the controller to perform operations of an acquisition mode, the photodetector providing an electronic signal indicative of output of the optical modulator may be a fast photodetector. This provides the TRX engine with more information than would be available from a slow photodetector, with the recognition that the TRX engine is inherently fully equipped to process the full spectrum of the signal output by the optical modulator. The photodetector feeding optical modulator output to the TRX engine may thus have substantially the same bandwidth as the photodetector of the far-side receiver to which the optical interconnect transceiver is communicatively coupled, and may thus have a bandwidth equal to or greater than a bandwidth of the optical signal.

In some embodiments of the present invention, the photodetector feeding optical modulator output to the TRX engine has a bandwidth which is less than a bandwidth of the optical signal. This may be the case for example when the TRX engine is configured with built-in functions which it can use to adequately implement its role in the acquisition phase based on bandlimited feedback from the photodetector. For example, the TRX engine may be configured to search for particular patterns in the optical modulator output and to initiate adjustments based on these patterns. The patterns may be discernible with less than the full optical signal bandwidth, hence in such cases a photodetector with less than the full optical signal bandwidth may be employed. To facilitate this, the TRX engine may have specific patterns to be sent to the modulator with pre-adjustments (pre-distortions etc) considering the impact of the monitor detector.

It is also recognized herein that a slow photodetector can generally be replaced by a fast photodetector with only limited additional expense. This can allow for a reduction in the number of photodetectors in the interconnect transceiver, because a single fast photodetector can be operated in place of a slow photodetector in one mode of operation, and can be operated as a fast photodetector where necessary in another mode of operation. For example, although the controller 145 input only has need of a slow photodetector, a fast photodetector can be used to provide information to the controller when this fast photodetector is also operatively coupled to the TRX engine.

The modulator 165 can be of a type other than a MRR, such as a Mach-Zehnder modulator (MZI), a vertically emitting laser modulator (VECSEL), an electro-absorption modulator (EAM), a microdisk modulator, or another type. This also applies to embodiments of the present invention as described elsewhere herein.

The TRX engine 110 can have analog capabilities, digital capabilities, or a combination thereof, which are configured to achieve a desired performance. The TRX engine can be configured to operate with known metrics that are independent of the link. The low-speed detector 130 at the input of the MRR modulator 165 and the low-speed detector 135 at the output of the MRR modulator can be employed to perform optimal adjustments.

In FIG. 1 and embodiments of the present invention, the TRX engine 110 can contain a module 150 incorporating a feed-forward equalizer (FFE), a decision feedback equalizer (DFE), a retimer, and a serializer/deserializer (SerDes), a driver 155, a transimpedance amplifier (TIA) 160, and all the components required to measure the metrics for evaluating and optimally tuning the transmitter's performance.

A TRX engine 110 such as in FIG. 1 conventionally has, by design, little or no communication with the controller 145. In much of the prior art, the controller 145 is considered as a separate module, to be designed and provided separately. That is, the control of the electro-optic modulator is conventionally achieved without support from the TRX engine.

The controller 145 can use optical modulation amplitude (OMA) measurements which impose significant hardware cost challenges on the electronics and the complexity of control algorithms. Coordination with the laser 170, the driver 155, etc., can be important. Fast (high-speed) PDs are relatively simple and inexpensive to fabricate with silicon photonics. However, the control circuitry required for operating a high speed PD is significantly more expensive, complicated, and requires more power relative to the control circuitry required for operating slow PD systems.

In embodiments of the present invention, an electronics-based, two-state switch can be included in a transceiver module 105 that integrates an electronic CMOS-based transceiver engine 110, and a (e.g. silicon-based) optical module 115 containing a transmitter and receiver. The switch may be operated by the controller, for example. The transceiver engine is also referred to herein as a TRX engine, or CMOS TRX engine.

Figure 2:
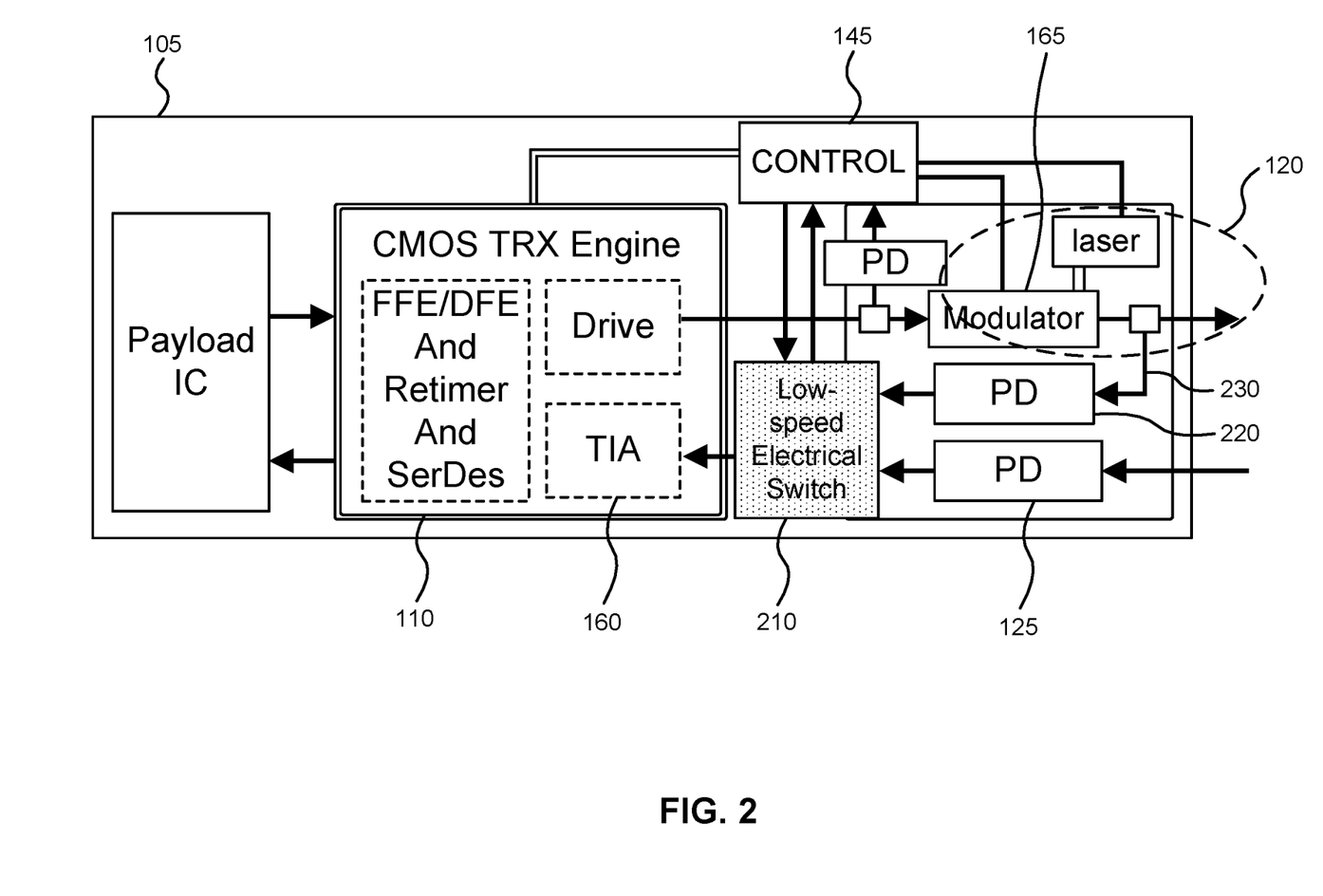
FIG. 2 illustrates an interconnect system where a two-state switch is integrated between a transceiver engine and a silicon photonics component, according to an embodiment of the present invention.

FIG. 2 illustrates an embodiment of the present invention, which includes a switch 210. The switch 210 can be implemented using CMOS electronics, for example. The switch can be implemented using transistors, micro-electromechanical components, or another technology, provided that the switch performs adequately. The switch 210 is configured to receive signals from a PD 125 configured to detect an external optical signal as part of a receiver operation, and also from a PD 220 at the output 230 of an optical modulator 165. As illustrated, the optical modulator 165 may include an MRR, although other types of modulator can be used. The PD 220 is configured to monitor the optical signal output by the optical modulator 165. This may be achieved for example by tapping or splitting the optical modulator output to route a limited portion of its output to the PD 220. In some embodiments, the PD 220 is separate from the PD 125. The switch 210 can be controllably switched between a first state and a second state. In the first state, the switch receives and feeds back the output signal 230 of a transmitter's optical modulator 165 (following conversion by PD 220) to an input TIA 160 of the TRX engine 110 of the transceiver module. This can be implemented to support the acquisition of modulator data to identify an optimal point of operation for subsequent control purposes. In the second state, the switch receives and passes the output signal 230 to an input of the controller (following conversion by PD 220), for real-time, feedback-based control of MRR modulator 165. In the second state, the output signal 230 is fed back for control purposes but bypasses the TRX engine 110.

An electrical switch 210 can be implemented efficiently on interconnect 105 with CMOS transistors. The switch can be low-speed in the sense that it can operate with a switching frequency in ranges from kilohertz (kHz) to megahertz (MHz). A switch can have the function of mirroring the output of the transmitter 120 either to the input of the TRX engine 110 at the TIA 160, or to the control system 145, depending on the switch state.

More specifically, in an acquisition mode (also referred to as a first mode), the switch operates in the first state to direct output from the transmitter portion 120 to the TRX engine 110 at TIA 160 so that optimal transmitter operation points can be identified and subsequently be used during the normal mode. In a normal mode (also referred to as a second mode), the switch operates in the second state to direct output from the transmitter portion 120 to the controller 145 in real-time, so that the controller 145 can maintain an optimal state of operation for the transmitter 120, also using the optimal operation points acquired in a previous acquisition mode.

Figure 3:
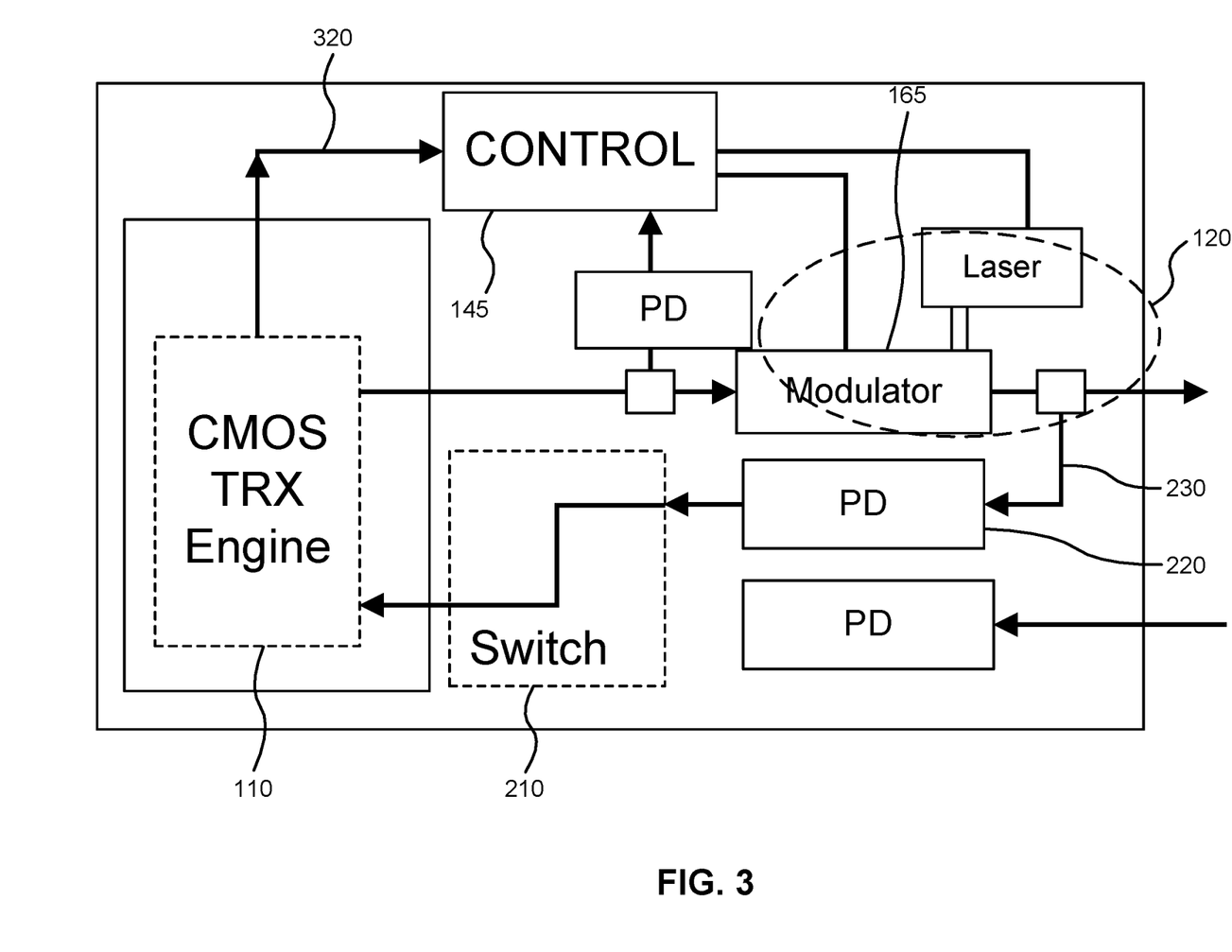
FIG. 3 illustrates an interconnect system where a two-state switch is configured to an acquisition mode, according to an embodiment of the present invention.

FIG. 3 illustrates a configuration of FIG. 2 where the switch 210 is configured in the first state according to an acquisition mode. In this mode, the switch can transmit (map), through a photodetector 220, a monitored signal 230 of the transmitter portion 120 output to TRX engine 110. That is, the switch receives output from the photodetector 220 and provides this output to the TRX engine 110. This mode allows for acquisition of controller data so that the TRX engine, having the full capability to collect data and assess the performance of the modulated signal as is seen similarly at its corresponding far-end receiver, can identify optimal points of operation for the controller. In other words, in the acquisition mode, the output of the (e.g. MRR) modulator is monitored, converted to an electrical signal, and provided to the TRX engine for processing. The output of the MRR modulator may be provided to the TRX engine with substantially its full modulated bandwidth. Results of this processing are passed to the controller 145 and used for adjustment thereof. The TRX engine 110 receives and processes output of the photodetector 220, and provides information to the controller via communication path 320. The controller adjusts the MRR 165, laser, or both, based at least in part on the information provided via the communication path 320.

Figure 4:
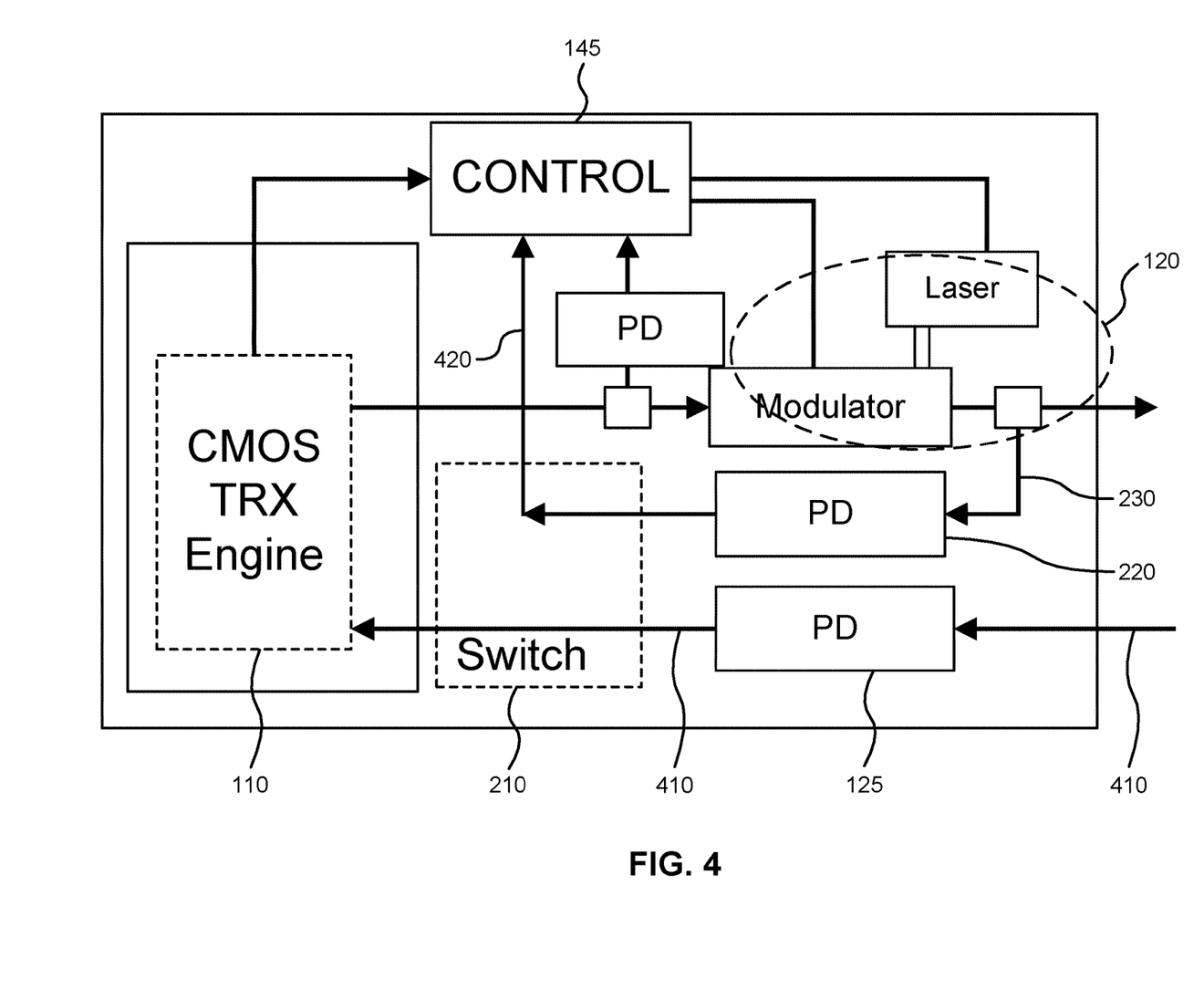
FIG. 4 illustrates an interconnect system where a two-state switch is configured to a normal mode, according to an embodiment of the present invention.

FIG. 4 illustrates a configuration of FIG. 2 where a switch 210 is configured in the second state, according to a tracking or normal operating mode. In some embodiments, the switch is configured to this state only after the TRX engine 110 has already established optimal operating points during a previous acquisition mode as represented in FIG. 3. In the normal operating mode, the operation data acquired in the acquisition mode is used as reference and target point and the controller 145 reads photodetector data via input path 420. The controller 145 is fed an electronic signal via path 420 in real-time by the photodetector 220 which receives and converts the monitored portion 230 of the transmitter portion 120's output. The electronic signal 420 is routed to the controller using the switch 210. Based on this, the controller 145 can operate to track and lock to previously determined, adequate or optimal operating conditions. In this mode, and in the illustrated embodiment, the switch also allows mapping of a receiver's input 410, through a PD 125, to the TRX engine 110. As such, the CMOS TRX engine can support optical transmission and reception. The use of the switch to also map the receivers input 410 to the TRX engine may allow for the same input of the TRX engine to be used for multiple purposes, thereby leading to a more efficient use of electronic components. However, this is not necessary and in other embodiments such sharing of TRX engine inputs does not occur.

It is noted that the controller typically does not have the same capabilities as the CMOS TRX engine to process the electronic signal 420. For example, the controller typically does not have adequate bandwidth to monitor all aspects of the electronic signal 420, nor does it typically have adequate capability to decode or perform advanced processing of the electronic signal 420. Rather, the controller may only have limited capability to determine certain trends or average values in the electronic signal 420. This is not necessarily a strict requirement of the present invention, but rather a statement of fact, as designers generally prefer to match controller capabilities to actual requirements. Nonetheless, according to embodiments of the present invention, the controller is configured with sufficient capabilities to adjust the modulator to track a predetermined operating point, given these limited capabilities, which are less than the capabilities required to perform all the necessary operations in the acquisition mode. In the acquisition mode, the controller relies instead on capabilities of the CMOS TRX engine. The controller can include various electronic components as would be readily understood by a worker skilled in the art, such as digital circuitry, analog circuitry, application specific integrated circuits, or a combination thereof.

In embodiments of the present invention, an interconnect module containing a switch 210 can be used in a series of steps classified into an acquisition mode and a tracking mode.

Figure 5:
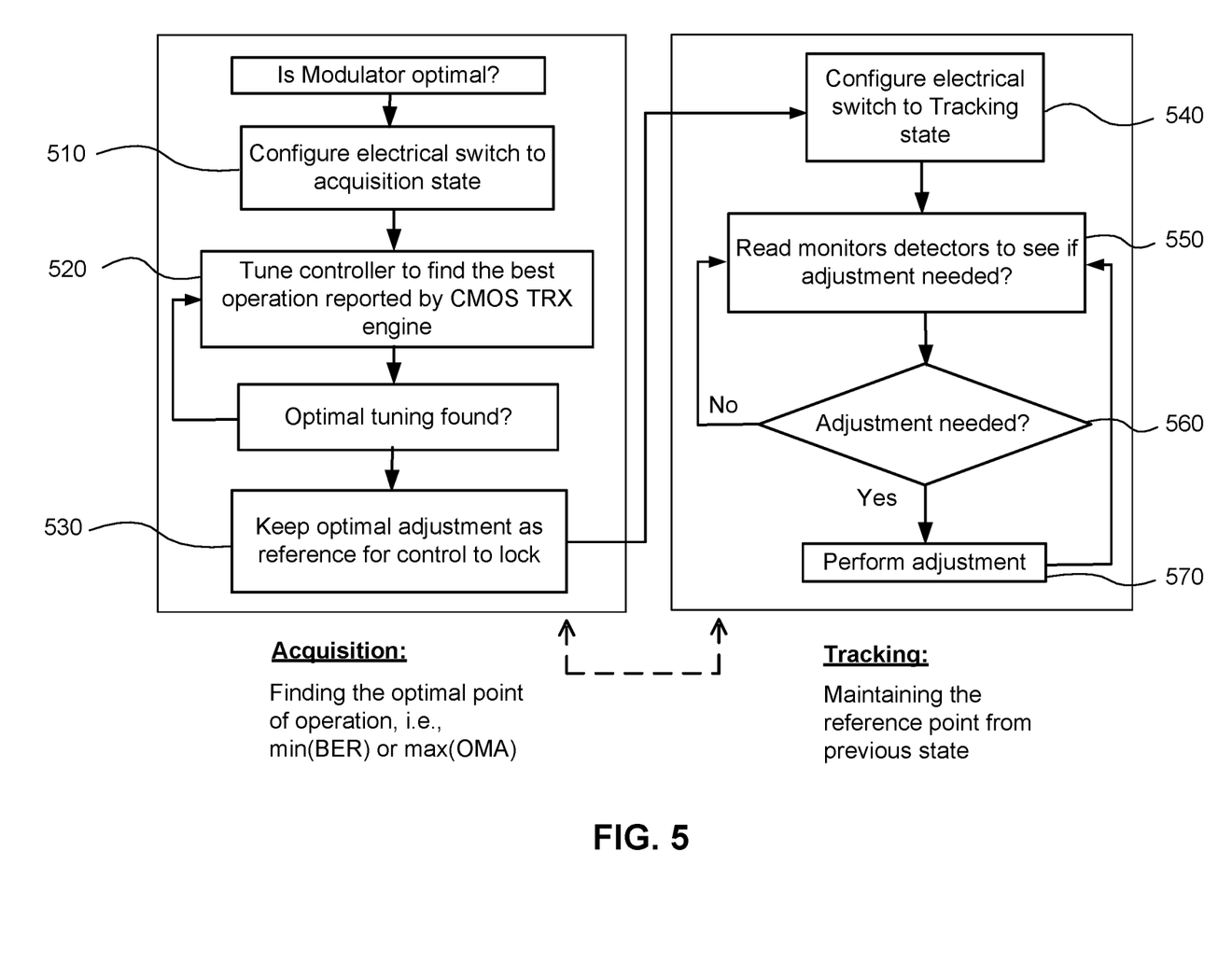
FIG. 5 illustrates a method for operation of an interconnect transceiver, according to an embodiment of the present invention.

FIG. 5 illustrates a method provided in accordance with an embodiment of the present invention. The method uses an interconnect module incorporating a switch 210, to optimize the operation of a transmitter 120. First, the electrical switch 210 can be configured 510 to a first state, corresponding to an acquisition mode, for example as illustrated in FIG. 3. Second, a controller 145 is tuned 520 to find the best (e.g. optimal) operation reported by the transceiver engine. Once an optimal adjustment has been found, it is kept 530 as a reference to which to lock the controller. Then, the switch can be configured to a second state 540, corresponding to a transmitter tracking mode, also called a normal state and mode herein, for example as illustrated in FIG. 4. In this state and mode, the controller reads the emitted signal's properties 550, determines whether adjustments are needed 560, and performs 570 adjustments as necessary. The controller performs adjustments to the modulator to keep the modulator operating at the determined optimal tuning.

Figure 6:
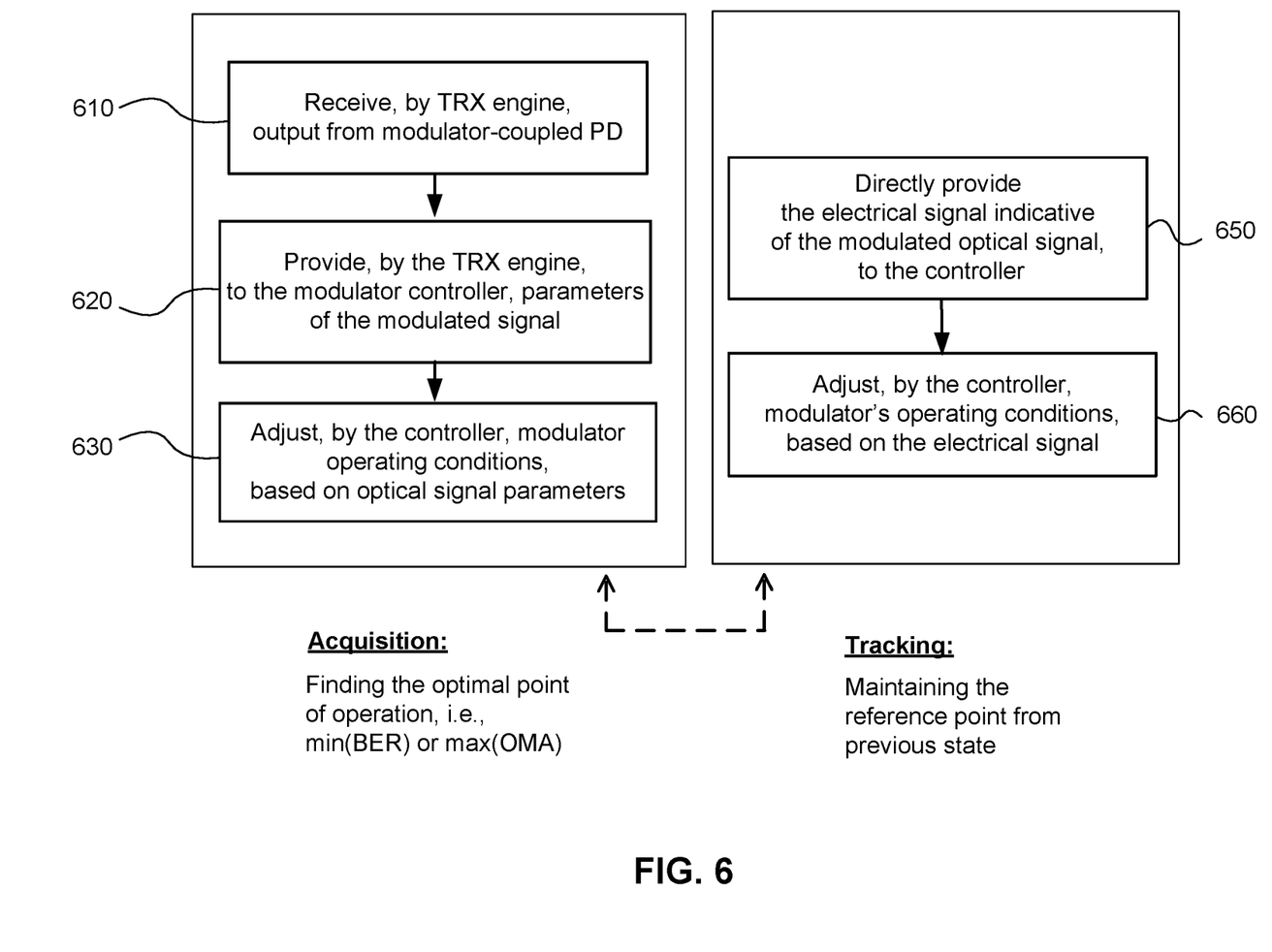
FIG. 6 illustrates a method operation of an interconnect transceiver, according to another embodiment of the present invention.

FIG. 6 illustrates a method provided in accordance with another embodiment of the invention. The method is for implementation in an optical interconnect transceiver for transmitting and receiving optical signals. As will be understood in view of the above, the optical interconnect transceiver includes a modulator configured to provide a modulated optical signal for transmission, and a transceiver engine which configured to operate the modulator in generation of the modulated optical signal. The transceiver engine may be further configured to process optical signals received by the optical interconnect transceiver following conversion to corresponding electrical signals. The method includes, for example in an acquisition mode of operation, receiving 610, by the transceiver engine, output of a photodetector operatively coupled to the modulator. The photodetector is configured to generate, as said output, an electrical signal indicative of the modulated optical signal. The method includes providing 620, by the transceiver engine to a controller, parameters indicative of the modulated optical signal. The method includes adjusting 630, by the controller, the one or more operating conditions of the modulator based on the parameters indicative of the modulated optical signal.

In some embodiments, the method further includes, in another (e.g. tracking) mode of operation, directly providing 650 the electrical signal indicative of the modulated optical signal to the controller. In such embodiments, the method further includes adjusting 660, by the controller, the operating conditions of the modulator based on the electrical signal.

It is noted that, in various embodiments, the acquisition mode can be re-entered from the tracking mode. For example, if the controller can no longer adequately perform tracking operations due to significant departure from a reference point, a re-acquisition can be performed by transitioning from the tracking mode back to the acquisition mode. This is indicated for example by double-sided arrows in FIGS. 5 and 6.

Figure 7:
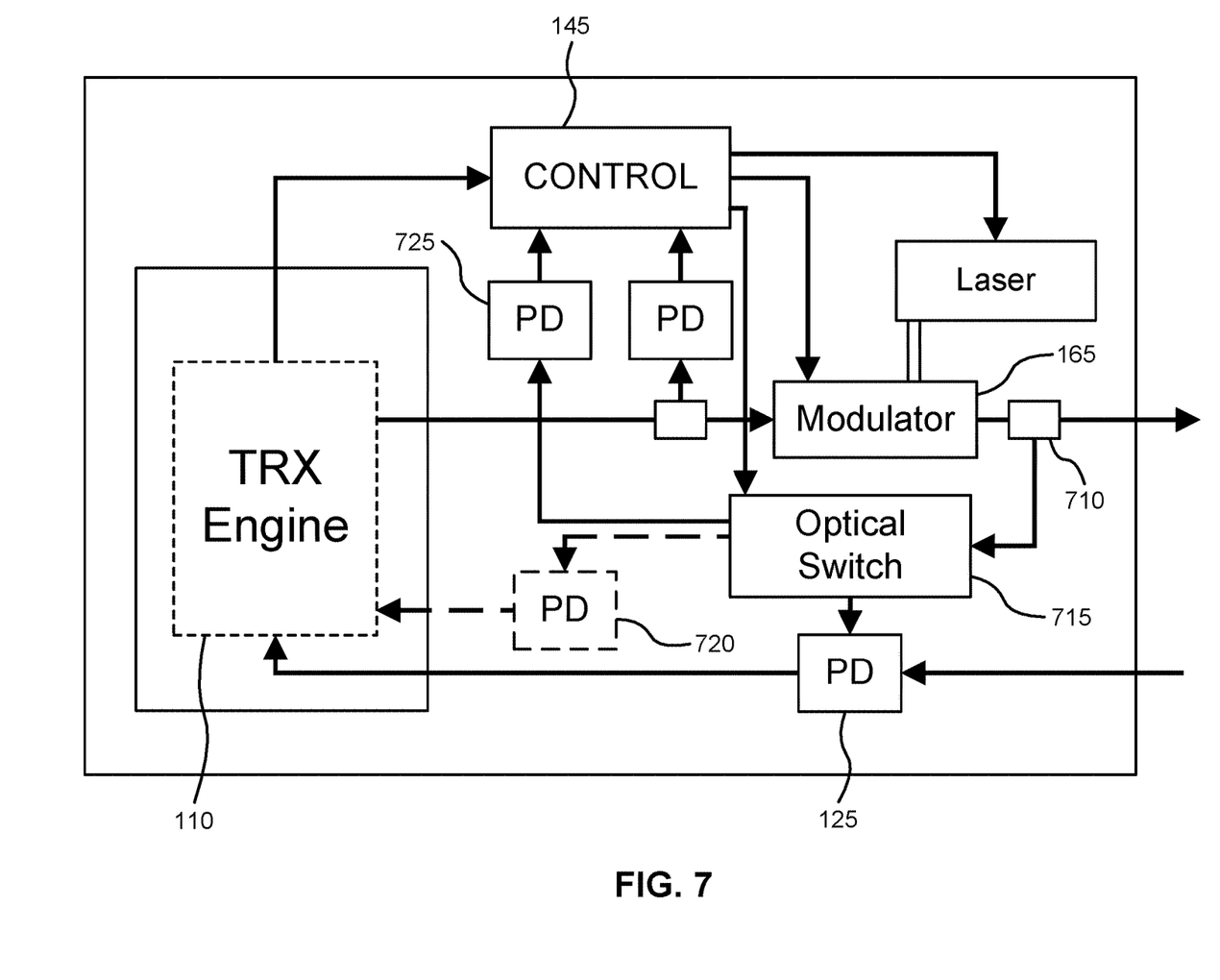
FIG. 7 illustrates an interconnect system with a two-state optical switch, according to another embodiment of the present invention.

Although embodiments of the present invention are described above primarily with respect to an electrical switch which receives output of a photodetector, it is recognized that other embodiments may be employed using an optical switch instead of (or in addition to) an electrical switch. FIG. 7 illustrates an interconnect transceiver system with a multi-state optical switch 715, according to another embodiment of the present invention. The transceiver system includes a modulator 165, a transceiver engine 110, and a controller 145, which are each configured substantially as described elsewhere herein. By using an optical switch 715 coupled to the input(s) of one or more photodetectors 125, 725 (or 720), the modulator output signal can be selectably provided to either the TRX engine or the controller, in much the same manner as by using an electrical switch coupled to the output of a photodetector.

The transceiver system of FIG. 7 includes a first photodetector 125 configured to receive a portion of the modulator 165 output and to generate an electrical signal indicative of this portion of the modulator output, which is passed to the transceiver engine 110. The transceiver system further includes a second photodetector 725 which is different from the first photodetector. The second photodetector 725 is configured to receive the portion of the modulator 165 output and to generate a second electrical signal indicative of this portion of the modulator output, which is passed to the controller 145. The first and second photodetectors 125, 725 can have the same operating characteristics or different operating characteristics. For example the second photodetector 725 can have a different bandwidth than the first photodetector 125. Additionally or alternatively, the second photodetector 725 can operate over a different range of frequencies than the first photodetector 125.

The first and second photodetectors 125, 725 can monitor different portions of the modulator 165 output, for example by using different taps or by using an optical splitter after the tap. However, in the presently illustrated embodiment, the transceiver system also includes an optical switch 715. The optical switch is configured to receive a portion of modulator's output, for example using an optical tap 710. The optical switch 715 is also selectably operable (e.g. by the controller) between a first state and a second state. In a first (e.g. acquisition) mode, the switch 715 is configured to operate in the first state to provide the portion of the modulator's output to the first photodetector 125. In the second (e.g. tracking) mode, the switch 715 is configured to operate in the second state to provide the portion of the modulator's output to the second photodetector 725. Accordingly, modulator output is fed back to the appropriate circuitry (i.e. either the TRX engine or the controller) at the appropriate time. The optical switch 715 may be a Mach-Zehnder interferometer based switch, for example, or another type of optical switch.

In the embodiment of FIG. 7, the first photodetector 125 is also used as the photodetector for receiving optical signals from an external receiver. This is possible when signal reception is not necessary during the acquisition mode, which is expected to be a typical mode of operation. However, in other embodiments, the first photodetector can be provided as a separate photodetector from that used for receiving optical signals from the external receiver, and output of the different photodetectors can be routed to different inputs of the TRX engine, or to the same input by using a further electronic switch. Photodetector 720 is illustrated to demonstrate such an option. When photodetector 720 is present, the optical switch 715 switchably provides light to either photodetector 720 or 725, and does not necessarily switchably provide light to photodetector 125. When photodetector 720 is not present, the optical switch switchably provides light to either photodetector 125 or 725.

In embodiments of the present invention, the transmitter's modulator can be one of a microring resonance (MRR) modulator, a Mach-Zehnder modulator (MZI), a vertically emitting laser modulator (VECSEL), electro-absorption modulator (EAM), a direct modulation (DML) modulator, a microdisk modulator, a device that can modulate a laser output, or another appropriate type of modulator. The modulator may in various embodiments be described as being configured to controllably modulate an optical carrier to produce an optical signal. The optical carrier may be generated by another device such as a laser.

According to embodiments of the invention, the TRX engine may be augmented with additional features or functionalities to enable it to adequately read or feed the controller with information necessary for tuning the modulator. For example, the TRX engine can be configured to include functionalities that would otherwise be implemented by the controller for adjusting the optical modulator, at least in the acquisition mode. In this case, the TRX engine may provide direct instructions to the controller or even bypass the controller and adjust the modulator or associated components (e.g. lasers, heaters, supply voltages or currents) directly. In other embodiments, the TRX engine provides information to the controller, and the controller performs some or all necessary control operations for the acquisition mode based on this information.

According to various embodiments, a controller is provided and configured to controllably adjust one or more operating conditions of an optical modulator. The controller can operate independently in a normal or tracking mode to maintain operation of the optical modulator at or near predetermined set point conditions. For example, the controller can adjust electronic heating elements coupled to an MRR modulator which act to tune the MRR modulator. It is considered that, as part of the adjustment of operating conditions, the controller can also adjust operating conditions of associated components such as the laser providing input to the modulator. The controller can further operate in coordination with a transceiver engine when in an acquisition mode. In both the acquisition mode and the tracking mode, the transceiver engine operates the modulator to generate the modulated optical signal and to receive and process optical signals received from another remote device and converted, by a photodetector, to corresponding electrical signals. In the acquisition mode, the controller and transceiver engine together operate to determine the set point conditions to be followed in the tracking mode. In the acquisition mode, the transceiver engine receives and processes an electrical signal indicative of the modulated optical signal via an internal loopback. The transceiver engine further provides, to the controller, feedback indicative of the modulated optical signal. Further, in the acquisition mode, the controller is configured to adjust operating conditions of the modulator based on the feedback, from the transceiver engine, indicative of the modulated optical signal.

The controller may employ a variety of different means at its disposal to achieve adequate or optimal operating conditions during the acquisition mode. For example, the controller may monitor, adjust, or both monitor and adjust one or more of: laser power, laser emission wavelength, temperature of the modulator, driver conditions such as electrical biasing (DC biasing), current, voltage, and RF power conditions, operation of one or more heating elements, monitoring of one or more temperature sensors, etc.

Although the embodiment of FIG. 2 includes a physical switch, other embodiments may include a different number or configuration of switches, or they may exclude a physical switch. For example, in one embodiment, rather than using the switch to controllably route output of the photodetector 220 to either the controller or the transceiver engine, output of the photodetector can be (non-switchably) routed concurrently to both the controller and the transceiver engine, where they are monitored using high-impedance input ports, for example. The transceiver engine can sample and utilize the output of the photodetector 220 when operating in the acquisition mode and otherwise ignore the output of the photodetector. Similarly, the controller can sample and utilize the output of the photodetector 220 when operating in the tracking mode and otherwise ignore the output of the photodetector. As another example, two on-off physical switches can be used in place of the single-pole, double-throw switch of FIG. 2. As yet another example, two photodetectors can be used in place of the single photodetector 220, with one of the two photodetectors switchably or non-switchably connected to the controller and the other of the two photodetectors switchably or non-switchably connected to the transceiver engine. Other configurations are also possible.

Furthermore, in some embodiments, the receiver can operate even during the acquisition mode. This can be facilitated by routing (e.g. non-switchably) output of the photodetector 125 to one input of the transceiver engine, and (e.g. switchably) routing output of the photodetector 220 to another, different input of the transceiver engine. However, it has been recognized that, in various embodiments, routing the outputs of both photodetectors 125 and 220 to the same input (but at different times) can provide for improved efficiency by reducing the number of required inputs of the transceiver engine.

In view of the above description, embodiments of the present invention provide for an interconnect transceiver for transmitting and receiving optical signals, generally described as follows. The transceiver includes at least a modulator, a photodetector, a controller, and a transceiver engine which may be separate from the controller. The transceiver can include multiple photodetectors. The transceiver can include one or more electrical switches. The modulator is configured to provide a modulated optical signal for transmission. The transceiver can include one or more optical switches. In a first (e.g. acquisition) mode, the transceiver engine is configured to operate to receive and process output of the modulator. Based on this processing, the transceiver engine provides parameters or information to the controller. Based on these parameters or information, the controller controls the modulator, for example by adjusting the operating conditions of the modulator. Therefore, the transceiver engine is included in the feedback loop for performing certain modulator control tasks.

In various embodiments, the transceiver engine is omitted from the feedback loop for other control tasks. For example, in a second (e.g. tracking) mode, the modulator output is fed to the controller directly, bypassing the transceiver engine. In the tracking mode, the controller still controls the modulator, for example by adjusting the operating conditions thereof. However, the controller may not necessarily have (or require) the same capabilities and bandwidth as the transceiver engine when performing this task. Therefore, the transceiver engine is selectably and controllably included and excluded from the feedback loop, at different times and based on current control or mode requirements.

Generally speaking, the transceiver engine and the controller operate in the electrical domain. Therefore, at least one photodetector is provided in order to convert the modulator's optical output to electrical signals for feedback purposes. A feedback circuit, which can include photodetectors, optical or electrical switches, or a combination thereof, is provided and operated to provide the modulator's output, appropriately converted to electrical signals, to the transceiver engine in the first mode, and, where applicable, to the controller in the second mode. Switches can be useful to avoid providing signal where it is not required. This may avoid unnecessarily drawing from the modulator output when not required. However, in some cases switches may be omitted and the transceiver engine or controller can simply block or ignore the feedback signals (indicative of modulator output) when such feedback signals are not required. The switches of the feedback circuit can be controlled by the controller.

In the embodiment of FIG. 2, the feedback circuit includes photodetector 230 and switch 210. The photodetector 230 converts a portion of output from the modulator 165 to electrical signals and provides this output to the switch 210. The switch provides the signal to either the transceiver engine or the controller, as required and shown in FIGS. 3 and 4. In the embodiment of FIG. 7, the feedback circuit includes an optical switch 715 and photodetectors 125 (or 720) and 725. The optical switch, which may be controlled by the controller, provides a portion of the modulator's output to either one of the photodetectors, which in turn provide electrical signals indicative of the modulator output to either the transceiver engine or the controller. Other implementations of a feedback circuit can be used. For example, the switches 210 or 715 can be replaced with signal splitters which provide both switch outputs concurrently. The feedback circuit can also include amplifiers, signal conditioners, analog or digital signal processing components, or the like.

Although the present invention has been described with reference to specific features and embodiments thereof, it is evident that various modifications and combinations can be made thereto without departing from the invention. The specification and drawings are, accordingly, to be regarded simply as an illustration of the invention as defined by the appended claims, and are contemplated to cover any and all modifications, variations, combinations or equivalents that fall within the scope of the present invention.

We claim:

1. An interconnect transceiver for transmitting and receiving optical signals, comprising:
    a modulator configured to provide a modulated optical signal;
    a photodetector operatively coupled to an output of the modulator, the photodetector configured to generate an electrical signal indicative of the modulated optical signal;
    a transceiver engine configured to operate the modulator in generation of the modulated optical signal and further configured to process optical signals received by the interconnect transceiver following conversion to corresponding electrical signals;
    the transceiver engine further configured to operate, in a first mode, to receive and process the electrical signal indicative of the modulated optical signal, and to provide parameters indicative of the modulated optical signal,
    a controller configured to controllably adjust one or more operating conditions of the modulator based on the parameters indicative of the modulated optical signal.

2. The interconnect transceiver of claim 1, further being operable in a second mode different from the first mode, wherein in the second mode the controller is configured to directly receive and process the electrical signal indicative of the modulated optical signal, and to controllably adjust said one or more operating conditions of the modulator based on the electrical signal.

3. The interconnect transceiver of claim 2, further comprising a switch selectably operable between a first state and a second state, wherein, in the first mode, the switch is configured to operate in the first state to provide the electrical signal to the transceiver engine and wherein, in the second mode, the switch is configured to operate in the second state to provide the electrical signal to the controller.

4. The interconnect transceiver of claim 1, further being operable in a second mode different from the first mode and further comprising a second photodetector operatively coupled to the output of the modulator and configured to generate a second electrical signal indicative of the modulated optical signal, wherein in the second mode the controller is configured to receive and process the second electrical signal, and to controllably adjust said one or more operating conditions of the modulator based on the second electrical signal.

5. The interconnect transceiver of claim 4, further comprising an optical switch selectably operable between a first state and a second state, the optical switch configured to receive a portion of the output of the modulator, wherein, in the first mode, the switch is configured to operate in the first state to provide the portion of the output of the modulator to the photodetector and wherein, in the second mode, the switch is configured to operate in the second state to provide the portion of the output of the modulator to the second photodetector.

6. The interconnect transceiver of claim 1, wherein the first mode is an acquisition mode for identifying an optimal transmitter operating condition at least in part using the transceiver engine.

7. The interconnect transceiver of claim 2, wherein the second mode is a tracking mode for tracking a previously identified optimal transmitter operating condition.

8. The interconnect transceiver of claim 2, wherein the controller is configured to cause the transceiver mode to switch between the first mode and the second mode.

9. A method, in an optical interconnect transceiver for transmitting and receiving optical signals, the optical interconnect transceiver comprising a modulator configured to provide a modulated optical signal for transmission and a transceiver engine configured to operate the modulator in generation of the modulated optical signal and further configured to process optical signals received by the optical interconnect transceiver following conversion to corresponding electrical signals, the method comprising:
    receiving, by the transceiver engine, output of a photodetector operatively coupled to the modulator, the photodetector configured to generate, as said output, an electrical signal indicative of the modulated optical signal;
    providing, by the transceiver engine to a controller configured to controllably adjust one or more operating conditions of the modulator, parameters indicative of the modulated optical signal; and
    adjusting, by the controller, said one or more operating conditions of the modulator based on the parameters indicative of the modulated optical signal.

10. The method of claim 9, further comprising, in another mode of operation, directly providing the electrical signal indicative of the modulated optical signal to the controller, and adjusting, by the controller, said one or more operating conditions of the modulator based on the electrical signal.

11. The method of claim 10, further comprising operating a switch to controllably direct said output of the photodetector either to the transceiver engine or to the controller, wherein the switch directs the output of the photodetector to the controller during said other mode of operation.

12. The method of claim 11, wherein the optical interconnect transceiver further includes a second photodetector configured to receive an external optical signal, wherein the switch further directs the output of the second photodetector to a first input of the transceiver engine during said other mode of operation, and wherein said first input also receives output of the photodetector when not in said other mode of operation.

13. The method of claim 9, further comprising, in another mode of operation, providing another electrical signal indicative of the modulated optical signal to the controller, and adjusting, by the controller, said one or more operating conditions of the modulator based on said other electrical signal, wherein said other electrical signal is provided by a second photodetector operatively coupled to the modulator and configured to generate the second electrical signal indicative of the modulated optical signal.

14. The method of claim 13, further comprising operating an optical switch selectably operable between a first state and a second state, the optical switch configured to receive a portion of the output of the modulator, wherein, in a first mode, the switch operates in the first state to provide the portion of the output of the modulator to the photodetector and wherein, in said other mode, the switch operates in the second state to provide the portion of the output of the modulator to the second photodetector.

15. The method of claim 9, wherein the modulator is a microring resonance modulator a Mach-Zehnder modulator (MZI), a vertically emitting laser modulator (VECSEL), an electro-absorption modulator (EAM), a direct modulation modulator, a microdisk modulator, or a laser modulator.

16. The method of claim 9, wherein the photodetector is a fast photodetector having a bandwidth equal to or greater than a bandwidth of the optical signal.

17. A method, in an interconnect transceiver for transmitting and receiving optical signals, the method comprising:
by a modulator, providing a modulated optical signal;
by a photodetector operatively coupled to an output of the modulator, generating an electrical signal indicative of the modulated optical signal;
by a transceiver engine, operating the modulator in generation of the modulated optical signal and processing optical signals received by the interconnect transceiver following conversion to corresponding electrical signals;
by the transceiver engine, operating, in a first mode, to receive and process the electrical signal indicative of the modulated optical signal, and providing parameters indicative of the modulated optical signal,
by a controller, controllably adjusting said one or more operating conditions of the modulator based on the parameters indicative of the modulated optical signal.

18. The method of claim 17, further comprising, by the controller operating in a second mode different from the first mode: directly receiving and processing the electrical signal indicative of the modulated optical signal, and controllably adjusting said one or more operating conditions of the modulator based on the electrical signal.

19. The method of claim 18, further comprising operating a switch selectably operable between a first state and a second state, wherein, in the first mode, the switch operates in the first state to provide the electrical signal to the transceiver engine and wherein, in the second mode, the switch operates in the second state to provide the electrical signal to the controller.

20. The method of claim 17, further comprising operating in a second mode different from the first mode, wherein in the second mode the controller receives and processes a second electrical signal, and controllably adjusts said one or more operating conditions of the modulator based on the second electrical signal, the second electrical signal being indicative of the modulated optical signal and generated by a second photodetector operatively coupled to the output of the modulator.

21. The method of claim 20, further comprising operating an optical switch selectably operable between a first state and a second state, the optical switch configured to receive a portion of the output of the modulator, wherein, in the first mode, the switch operates in the first state to provide the portion of the output of the modulator to the photodetector and wherein, in the second mode, the switch operates in the second state to provide the portion of the output of the modulator to the second photodetector.

22. An apparatus operable in association with transmitting and receiving optical signals, the apparatus comprising:
a transceiver engine configured to receive output of a photodetector operatively coupled to a modulator, the photodetector configured to generate, as said output, an electrical signal indicative of the modulated optical signal, the modulator configured to provide a modulated optical signal for transmission, the transceiver engine further configured to operate the modulator in generation of the modulated optical signal, and to process external received optical signals following conversion to corresponding electrical signals;
a controller configured to: receive, from the transceiver engine, parameters indicative of the modulated optical signal; and to controllably adjust one or more operating conditions of the modulator; and
the controller further configured to adjust said one or more operating conditions of the modulator based on the parameters indicative of the modulated optical signal.

23. The apparatus of claim 22, further configured, in another mode of operation, to directly provide the electrical signal indicative of the modulated optical signal to the controller, and to adjust, by the controller, said one or more operating conditions of the modulator based on the electrical signal.

24. The apparatus of claim 23, further configured to operate a switch to controllably direct said output of the photodetector either to the transceiver engine or to the controller, wherein the switch directs the output of the photodetector to the controller during said other mode of operation.

25. The apparatus of claim 24, further comprising a second photodetector configured to receive an external optical signal, wherein the switch further directs the output of the second photodetector to a first input of the transceiver engine during said other mode of operation, and wherein said first input also receives output of the photodetector when not in said other mode of operation.

26. The apparatus of claim 22, further configured, in another mode of operation, to provide another electrical signal indicative of the modulated optical signal to the controller, and to adjust, by the controller, said one or more operating conditions of the modulator based on said other electrical signal, wherein said other electrical signal is provided by a second photodetector operatively coupled to the modulator and configured to generate the second electrical signal indicative of the modulated optical signal.

27. The apparatus of claim 26, further configured to operate an optical switch selectably operable between a first state and a second state, the optical switch configured to receive a portion of the output of the modulator, wherein, in a first mode, the switch is configured to operate in the first state to provide the portion of the output of the modulator to the photodetector and wherein, in said other mode, the switch is configured to operate in the second state to provide the portion of the output of the modulator to the second photodetector.

28. The apparatus of claim 22, wherein the modulator is a microring resonance modulator a Mach-Zehnder modulator (MZI), a vertically emitting laser modulator (VECSEL), an electro-absorption modulator (EAM), a direct modulation modulator, a microdisk modulator, or a laser modulator.

29. The apparatus of claim 22, wherein the photodetector is a fast photodetector having a bandwidth equal to or greater than a bandwidth of the optical signal.

30. An apparatus operable in association with transmitting and receiving optical signals, the apparatus comprising:
- a controller configured to control a modulator, the modulator configured to controllably modulate an optical carrier to produce an optical signal; and
- a switch switchable between a first state and a second state, wherein:
  - in the first state, the switch directs an output signal of a photodetector to a transceiver engine, the photodetector monitoring the optical signal; and
  - in the second state, the switch directs the output signal of the photodetector to the controller.

31. The apparatus of claim 30, wherein the controller is further configured to control the switch.

32. The apparatus of claim 30, wherein the transceiver engine is implemented using a complementary metal-oxide semiconductor (CMOS) fabrication process.

33. The apparatus of claim 30, wherein the modulator is implemented using a silicon-based fabrication process, a silicon nitride fabrication process, or an indium phosphide fabrication process.

34. The apparatus of claim 30, wherein the switch is implemented using a complementary metal-oxide semiconductor (CMOS) fabrication process, or wherein the switch is a transistor-based switch, or wherein the switch is a microelectromechanical switch.

35. The apparatus of claim 30, wherein the modulator is a microring resonance modulator, a Mach-Zehnder modulator (MZI), a vertically emitting laser modulator (VECSEL), an electro-absorption modulator (EAM), a direct modulation modulator, a microdisk modulator, or a laser modulator.

36. The apparatus of claim 30, wherein the photodetector has a bandwidth equal to or greater than a bandwidth of the optical signal.

37. The apparatus of claim 30, wherein the photodetector has a bandwidth less than a bandwidth of the optical signal.

38. The apparatus of claim 30, further comprising a second photodetector configured to receive an external optical signal, wherein said directing the output signal of the photodetector to the transceiver engine comprises directing the output signal of the photodetector to a first input of the transceiver engine, and wherein the switch is configured, in the second state, to direct an output signal of the second photodetector to the first input of the transceiver engine.

39. A method, in association with transmitting and receiving optical signals, the method comprising:
- using a switch operating in a first state, directing an output signal of a photodetector to a transceiver engine, the photodetector monitoring an optical signal output by a modulator which controllably modulates an optical carrier to produce the optical signal; and
- using the switch operating in a second state, directing the output signal of the photodetector to a controller, the controller configured to control the modulator.

40. The method of claim 39, wherein the controller further operates to control the switch.

41. The method of claim 39, wherein the transceiver engine is implemented using a complementary metal-oxide semiconductor (CMOS) fabrication process.

42. The method of claim 39, wherein the modulator is implemented using a silicon-based fabrication process, a silicon nitride fabrication process, or an indium phosphide fabrication process.

43. The method of claim 39, wherein the switch is implemented using a complementary metal-oxide semiconductor (CMOS) fabrication process, or wherein the switch is a transistor-based switch, or wherein the switch is a microelectromechanical switch.

44. The method of claim 39, wherein the modulator is a microring resonance modulator, a Mach-Zehnder modulator (MZI), a vertically emitting laser modulator (VECSEL), an electro-absorption modulator (EAM), a direct modulation modulator, a microdisk modulator, or a laser modulator.

45. The method of claim 39, wherein the photodetector has a bandwidth equal to or greater than a bandwidth of the optical signal.

46. The method of claim 39, wherein the photodetector has a bandwidth less than a bandwidth of the optical signal.

47. The method of claim 39,
wherein said directing the output signal of the photodetector to the transceiver engine comprises directing the output signal of the photodetector to a first input of the transceiver engine, the method further comprising:
receiving, using a second photodetector, an external optical signal; and
using the switch operating in the second state, directing an output signal of the second photodetector to the first input of the transceiver engine.

\* \* \* \* \*